United States Patent [19]
Robinson et al.

[11] 3,863,889
[45] Feb. 4, 1975

[54] GATE VALVE

[75] Inventors: Bernie E. Robinson, Oak Creek;
Alfred L. Sachs, Wauwatosa, both of Wis.

[73] Assignee: Milwaukee Valve Company, Inc., Milwaukee, Wis.

[22] Filed: Mar. 22, 1973

[21] Appl. No.: 343,818

[52] U.S. Cl. ............................ 251/328, 251/368
[51] Int. Cl. ............................................ F16k 3/12
[58] Field of Search ........... 251/328, 329, 359, 360; 29/157.1 R

[56] References Cited
UNITED STATES PATENTS

| 685,438 | 10/1901 | Warburton | 251/329 |
| 1,795,433 | 3/1931 | Leipert | 251/359 X |
| 2,065,628 | 12/1936 | Taylor et al. | 251/359 X |

FOREIGN PATENTS OR APPLICATIONS

| 930,725 | 7/1963 | Great Britain | 251/327 |
| 44-4931 | 6/1964 | Japan | 251/328 |

*Primary Examiner*—Arnold Rosenthal

[57] ABSTRACT

The gate valve includes stamped, sheet metal seat rings which fit into inlet and outlet ports in the valve body. Each seat ring has a tubular sleeve which is secured inside the bore of the respective port and a circumferential flange which extends radially outwardly from the sleeve and seats against an annular, flat-surface shoulder surrounding the port. The planes of the shoulder faces are arranged at an angular relationship corresponding to that of the seating faces of the wedge-shaped gate member so that the flat outer faces on the seat ring flanges form a leak-tight, metal-to-metal seal with the gate member when the latter is moved to a closed position.

2 Claims, 2 Drawing Figures

PATENTED FEB 4 1975 3,863,889

GATE VALVE

BACKGROUND OF THE INVENTION

This invention relates to gate valves. Gate valves typically employ a wedge-shaped valve member or gate which is moved in to a wedging position between angular-related faces of a pair of seat rings to shut off the flow of fluid through the valve. The seat rings are mounted in opposed ports in the valve body. These ports are typically bored or cast in the valve body as straight through passages and the seat rings are provided with angular faces corresponding to the angular faces of the wedge of the gate member. The seat rings, particularly those used in valves for high pressure systems usually are machined from bar stock and are either threaded or staked into the valve ports. The seating surfaces of the seat rings and the gate member typically are lapped to close tolerances in order to obtain a leak-tight, metal-to-metal engagement therebetween when the valve is closed. Because of the machining and type of materials used, the seat rings are relatively expensive to fabricate. Also, in order to obtain the proper sealing engagement between the gate member and the seat rings, special precaution must be used during installation of the seat rings to insure that the angular seating faces are properly oriented with respect to the angular faces of the gate member. Thus, assembly costs also can be quite high. Furthermore, the valve body must be long enough to accommodate the relatively massive machined seat rings.

SUMMARY OF THE INVENTION

An object of this invention is to provide a gate valve which is capable of long term service in high pressure systems.

Another object of this invention is to provide a gate valve having inexpensive, easily installed seat rings.

A further object of the invention is to provide a compactly arranged gate valve.

A still further object of this invention is to provide inexpensive seat rings for a gate valve.

Other objects, aspects and advantages of the invention will become apparent upon reviewing the following detailed description and the drawing.

The gate valve provided by this invention includes inlet and outlet ports in the valve body which are formed at an angle to the horizontal corresponding to the taper of the seating faces of the wedge-shaped gate member and stamped sheet metal seating rings mounted in the ports. The seat rings, which include a tubular sleeve adapted to fit into the port bore and a radially extending annular flange adapted to surround the port, can be formed from inexpensive metallic materials, such as stainless steel, by conventional stamping process and, therefore, are substantially less expensive than the machined seat rings used in prior art valves. Instead of being screwed into place, the sheet metal seat rings can be simply and easily installed in place within the ports by staking, pressing, rolling, cementing, etc. Since the inlet and outlet ports are arranged at an angular relationship corresponding to that of the seating faces of the gate member, the seat rings can be installed without any special attention to their orientation.

It has been found that the coining effect produced on the faces of the seat ring during the stamping operation produces a seating surface which is superior to machined seating surfaces and at least equivalent to lapped seating surfaces of machine seat rings used in prior art valves.

DESCRIPTION OF THE PREFERRED EMBODIMENTS

Figure 1:
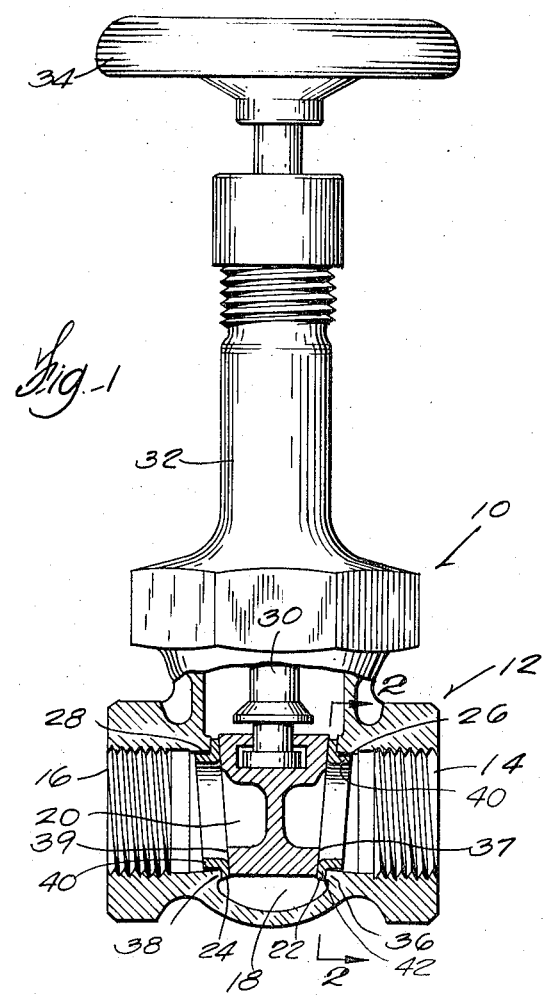
FIG. 1 is a side elevational view, partially sectioned, of a gate valve embodying this invention, shown in the closed position.
Figure 2:
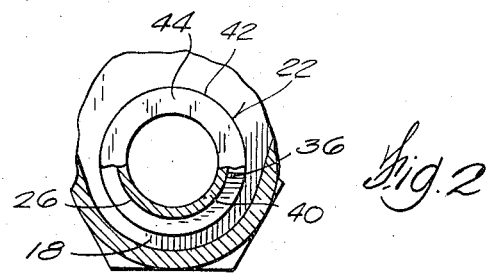
FIG. 2 is a view partially broken away taken along the plane designated 2—2 in FIG. 1.

The illustrated gate valve 10 embodying this invention includes a body 12 having an inlet 14, an outlet 16 and a valve chamber 18 interposed in the inlet and outlet. A wedge-shaped gate member 20, which reciprocates within valve chamber 18, cooperates with seat rings 22, 24 mounted in the inlet port 26 and the outlet port 28, respectively to shut off flow from inlet 14 to outlet 16. A stem 30 carrying gate member 20 is threadably and sealably mounted within bonnet 32 in a suitable manner so that, in response to rotation of hand wheel 34 (connected to the top of the stem), the stem is reciprocated vertically to control the position of the gate member within valve chamber 18.

Valve body 12 is provided with flat-faced, annular shoulders 36 and 38 which are concentric with and surround inlet port 26 and outlet port 28, respectively. As shown, the planes of the faces of shoulders 36 and 38 converge downwardly and are arranged at an angular relationship corresponding to the taper of the seating faces 37 and 39 of gate member 20. The longitudinal axes of the bores of inlet port 36 and outlet port 38 is perpendicular to the plane of the respective shoulder face. For instance, with a gate member having a 5° taper from the vertical for seating faces 37, 39, shoulders 36 and 38 are arranged at a 5° angle to the vertical and the longitudinal axes of ports 24 and 26 are arranged in an angle 5° from the horizontal, or the longitudinal axis of the primary direction of flow through the valve.

Both seat rings 22, 24 are identically arranged and are mounted in the respective valve ports in the same manner. Therefore, only seat ring 22 will be described in detail. Seat ring 22 includes a tubular sleeve 40 which fits snugly inside the bore of inlet port 26 and an annular flange 42 which extends radially outwardly from sleeve 40 and which seats against shoulder 36. The flat, smooth outer face 44 of flange 42 forms a leak-tight metal-to-metal seal with seating face 37 on gate member 22 when the latter is moved to the closed position.

Seat rings 22, 24 can be secured in place by any suitable fastening means, such as staking, cementing, rolling, pressing and the like. Generally, staking the seat ring sleeve to the valve port bore in a suitable manner is preferred because of the speed and simplicity of such a technique.

The seat rings are formed from a relatively thin (e.g., 0.045 inch) sheet metal material; preferably from a stainless steel, such as a 300 series stainless steel. Although other conventional forming processes can be used, the seat rings are preferably formed by a conventional stamping process because of the capability of high production rate and low operational costs.

Use of a stamping process to fabricate the seat rings of this invention have several other particular advantages. For instance, with 300 series stainless steel, the stamping operation produces a coining effect on the annular seating surface of the seat ring flange, resulting in a smooth, bright, mirror-like finish. The smoothness of this finish is substantially superior to that of machined seating surfaces and is at least equivalent to that of lapped seating surfaces of prior art seat rings. Since an abrasive lapping material is not used, the finish of the seating surfaces of the flange is, in many cases, superior to lapped seating surfaces. It should be understood that sheet metal materials other than 300 series stainless steel will provide similar advantageous results.

By using a work-hardenable material, such as 300 series stainless steel and the like, work-hardened seat rings having an increased hardness and, thus, an increased duty life can be produced by stamping. During operation of the valve, forces imparted by the gate member to the seat rings made from work-hardenable materials tends to promote further hardening and thereby further improve the duty life of the seat rings. Furthermore, seat rings produced by stamping are dimensionally uniform, thereby reducing the problems associated with the accumulation of manufacturing tolerances encountered with the use of machined seat rings.

Because of the comparatively thin seating flange, the inherently small size of stamped rings, and the capability of using space-saving fastening means, such as staking, cementing, rolling, pressing, etc., the mass and outer dimensions of the valve body can be made considerably smaller than is possible with valves which must accommodate machined seat rings, particularly threaded seat rings.

We claim:

1. A gate valve comprising
   a body including opposed inlet and outlet ports and a chamber interposed said inlet and outlet ports defining a flow passage extending through said body, each of said ports including a bore and an annular shoulder surrounding the opening thereof into said valve chamber, said shoulder having an outer face facing said valve chamber and the planes of said shoulder faces being opposed and angularly related;
   a tapered gate member located in said valve chamber and movably supported for reciprocative movement relative to said ports between an open position to permit flow through said flow passage and a closed position to shut off flow through said flow passage, said gate member having opposed, angularly related seating surfaces; and
   a seat ring mounted in each of said ports, each of said seat rings being stamped from a relatively thin sheet of stainless steel and including a tubular sleeve fitting snugly inside the respective of said bores and staked thereto and further including an annular flange extending radially outwardly from one end of said sleeve and rigidly seated against the respective of said shoulders, each of said seat ring flanges having a flat outer seating face which is sealingly engaged by the respective of said gate member seating surfaces when said gate member is in a closed position.

2. A gate valve according to claim 1 wherein said stainless steel is work-hardenable.

* * * * *